United States Patent
You et al.

(10) Patent No.: US 11,086,150 B2
(45) Date of Patent: Aug. 10, 2021

(54) PEEP-PROOF APPARATUS FOR SWITCHING A VIEWING ANGLE OF DISPLAY PANEL, DISPLAY APPARATUS, METHOD OF OPERATING DISPLAY APPARATUS, AND METHOD OF FABRICATING PEEP-PROOF APPARATUS

(71) Applicants: BOE TECHNOLOGY GROUP CO., LTD., Beijing (CN); Beijing BOE Display Technology Co., Ltd., Beijing (CN)

(72) Inventors: Yang You, Beijing (CN); Ruizhi Yang, Beijing (CN); Ruiyong Wang, Beijing (CN); Zhenhua Lv, Beijing (CN)

(73) Assignees: BOE TECHNOLOGY GROUP CO., LTD., Beijing (CN); Beijing BOE Display Technology Co., Ltd., Beijing (CN)

( * ) Notice: Subject to any disclaimer, the term of this patent is extended or adjusted under 35 U.S.C. 154(b) by 642 days.

(21) Appl. No.: 16/065,013

(22) PCT Filed: Jul. 6, 2017

(86) PCT No.: PCT/CN2017/092070
§ 371 (c)(1),
(2) Date: Jun. 21, 2018

(87) PCT Pub. No.: WO2019/006727
PCT Pub. Date: Jan. 10, 2019

(65) Prior Publication Data
US 2021/0208431 A1   Jul. 8, 2021

(51) Int. Cl.
*G09G 3/36*   (2006.01)
*G02F 1/13*   (2006.01)
(Continued)

(52) U.S. Cl.
CPC ........ *G02F 1/1323* (2013.01); *G02F 1/13471* (2013.01); *G02F 1/133531* (2021.01);
(Continued)

(58) Field of Classification Search
CPC ............. G02F 1/13471; G02F 1/13306; G02F 1/13362; G02F 1/1309; G02F 1/1323;
(Continued)

(56) References Cited

U.S. PATENT DOCUMENTS

2005/0243265 A1* 11/2005 Winlow ................ G02F 1/1323
349/178
2006/0192735 A1   8/2006 Morisawa
(Continued)

FOREIGN PATENT DOCUMENTS

CN   103091883 A   5/2013
CN   103792703 A   5/2014
(Continued)

OTHER PUBLICATIONS

Extended European Search Report in the European Patent Application No. 17893505.2, dated Dec. 11, 2020.
(Continued)

*Primary Examiner* — Abdul-Samad A Adediran
(74) *Attorney, Agent, or Firm* — Intellectual Valley Law, P.C.

(57) ABSTRACT

The present application discloses a peep-proof apparatus for switching a viewing angle of a display panel between a first viewing angle and a second viewing angle. The peep-proof apparatus includes a base substrate; a first liquid crystal layer on the base substrate; a second liquid crystal layer on a side of the first liquid crystal layer distal to the base substrate; a first controller configured to control the first liquid crystal layer to switch between being light transmissive and being light blocking in a plurality of first regions
(Continued)

spaced apart from each other while other regions in the first liquid crystal layer being light transmissive; and a second controller configured to control the second liquid crystal layer to switch between being light transmissive and being light blocking in a plurality of second regions spaced apart from each other while other regions in the second liquid crystal layer being light transmissive.

12 Claims, 6 Drawing Sheets

(51) Int. Cl.
    *G02F 1/1335*     (2006.01)
    *G02F 1/1347*     (2006.01)

(52) U.S. Cl.
    CPC ........... *G09G 3/36* (2013.01); *G09G 2354/00* (2013.01); *G09G 2358/00* (2013.01)

(58) Field of Classification Search
    CPC ............................ G02F 1/133531; G09G 3/36; G09G 2354/00; G09G 2358/00
    USPC ................. 1/1; 156/64; 345/87; 349/87, 178
    See application file for complete search history.

(56) References Cited

U.S. PATENT DOCUMENTS

| | | | |
|---|---|---|---|
| 2007/0146259 A1* | 6/2007 | Jin | G02F 1/13471 345/87 |
| 2013/0057790 A1* | 3/2013 | Xu | G02F 1/13306 349/15 |
| 2014/0063386 A1 | 3/2014 | Yang et al. | |
| 2014/0290826 A1* | 10/2014 | Koshio | G02F 1/1309 156/64 |
| 2016/0282650 A1 | 9/2016 | Qin et al. | |
| 2016/0306215 A1* | 10/2016 | Chen | G02F 1/13362 |

FOREIGN PATENT DOCUMENTS

| | | |
|---|---|---|
| JP | 2005107306 A | 4/2005 |
| JP | 2005107326 A | 4/2005 |
| JP | 2009198814 A | 9/2009 |

OTHER PUBLICATIONS

International Search Report & Written Opinion dated Mar. 28, 2018, regarding PCT/CN2017/092070.

\* cited by examiner

PEEP-PROOF APPARATUS FOR SWITCHING A VIEWING ANGLE OF DISPLAY PANEL, DISPLAY APPARATUS, METHOD OF OPERATING DISPLAY APPARATUS, AND METHOD OF FABRICATING PEEP-PROOF APPARATUS

CROSS-REFERENCE TO RELATED APPLICATION

This application is a national stage application under 35 U.S.C. § 371 of International Application No. PCT/CN2017/092070, filed Jul. 6, 2017, the contents of which are incorporated by reference in the entirety.

TECHNICAL FIELD

The present invention relates to display technology, more particularly, to a peep-proof apparatus for switching a viewing angle of a display panel between a first viewing angle and a second viewing angle, a display apparatus, a method of operating a display apparatus, and a method of fabricating a peep-proof apparatus.

BACKGROUND

Display apparatuses such as mobile phones, desktop computers, and laptop computers have been developed to provide many functions. A user may use the display apparatus to access various information including private information. For example, the user may use the display apparatus to access bank accounts, pay bills, carry out on-line purchases, and access various password-protected websites. When the user accesses the private information in public places, the user may be exposed to identity theft and invasion of privacy. Accordingly, in recent years, privacy protection has become a focus of research and development in display technology.

SUMMARY

In one aspect, the present invention provides a peep-proof apparatus for switching a viewing angle of a display panel between a first viewing angle and a second viewing angle, comprising a base substrate; a first liquid crystal layer on the base substrate; a second liquid crystal layer on a side of the first liquid crystal layer distal to the base substrate; a first controller configured to control the first liquid crystal layer to switch between being light transmissive and being light blocking in a plurality of first regions spaced apart from each other while other regions in the first liquid crystal layer being light transmissive; and a second controller configured to control the second liquid crystal layer to switch between being light transmissive and being light blocking in a plurality of second regions spaced apart from each other while other regions in the second liquid crystal layer being light transmissive; wherein the first viewing angle corresponds to both the plurality of first regions and the plurality of second regions being light blocking; the second viewing angle corresponds to both the plurality of first regions and the plurality of second regions being light transmissive; and the first viewing angle being smaller than the second viewing angle.

Optionally, the first controller comprises a first electrode layer comprising a plurality of first electrodes, each of which being configured to control liquid crystal molecule orientation in one of the plurality of first regions; and the second controller comprises a second electrode layer comprising a plurality of second electrodes, each of which being configured to control liquid crystal molecule orientation in one of the plurality of second regions.

Optionally, the plurality of first regions are arranged substantially along a first direction, each of the plurality of first regions extending substantially along a second direction; and the plurality of second regions are arranged substantially along the first direction, each of the plurality of second regions extending substantially along the second direction.

Optionally, the first liquid crystal layer further comprises a plurality of third regions, the plurality of third regions are arranged substantially along the first direction, each of the plurality of third regions extending substantially along the second direction, adjacent first regions of the plurality of first regions being spaced apart by one of the plurality of third regions; the second liquid crystal layer further comprises a plurality of fourth regions, the plurality of fourth regions are arranged substantially along the first direction, each of the plurality of fourth regions extending substantially along the second direction, adjacent second regions of the plurality of second regions being spaced apart by one of the plurality of fourth regions; the first controller is configured to control the plurality of first regions to switch between being light transmissive and being light blocking while the plurality of third regions being light transmissive; and the second controller is configured to control the plurality of second regions to switch between being light transmissive and being light blocking while the plurality of fourth regions being light transmissive.

Optionally, a projection of each of the plurality of first regions on the base substrate at least partially overlaps with that of one of the plurality of second regions.

Optionally, projections of the plurality of first regions and the plurality of second regions on the base substrate substantially overlap with each other; and projections of the plurality of third regions and the plurality of fourth regions on the base substrate substantially overlap with each other.

Optionally, projections of the plurality of first regions and the plurality of second regions on the base substrate are substantially non-overlapping with each other.

Optionally, projections of the plurality of fourth regions on the base substrate substantially cover the projections of the plurality of first regions on the base substrate.

Optionally, the first controller further comprises a third electrode layer comprising a plurality of third electrodes, each of which being configured to control liquid crystal molecule orientation in one of the plurality of third regions; and the second controller comprises a fourth electrode layer comprising a plurality of fourth electrodes, each of which being configured to control liquid crystal molecule orientation in one of the plurality of fourth regions.

Optionally, a projection of each of the plurality of first electrodes on the base substrate at least partially overlaps with that of one of the plurality of second electrodes.

Optionally, projections of the plurality of first electrodes and the plurality of second electrodes on the base substrate substantially overlap with each other; and projections of the plurality of third electrodes and the plurality of fourth electrodes on the base substrate substantially overlap with each other.

Optionally, projections of the plurality of first electrodes and the plurality of second electrodes on the base substrate are substantially non-overlapping with each other.

Optionally, projections of the plurality of fourth electrodes on the base substrate substantially cover the projections of the plurality of first electrodes on the base substrate.

Optionally, the first controller further comprises a fifth electrode layer on aside of the first liquid crystal layer distal to the first electrode layer and the third electrode layer; the second controller further comprises a sixth electrode layer on a side of the second liquid crystal layer distal to the second electrode layer and the fourth electrode layer; and the fifth electrode layer and the sixth electrode layer are provided with a common voltage.

Optionally, the first electrode layer, the third electrode layer, the fifth electrode layer, and the first liquid crystal layer constitute a first twisted nematic liquid crystal cell; and the second electrode layer, the fourth electrode layer, the sixth electrode layer, and the second liquid crystal layer constitute a second twisted nematic liquid crystal cell.

Optionally, the peep-proof apparatus further comprises a first polarizer on side of the first liquid crystal layer distal to the second liquid crystal layer; a second polarizer between the first liquid crystal layer and the second liquid crystal layer; and a third polarizer on side of the second liquid crystal layer distal to the first liquid crystal layer; wherein a transmission axis of the second polarizer is substantially perpendicular to those of the first polarizer and the third polarizer.

In another aspect, the present invention provides a display apparatus, comprising a display panel and the peep-proof apparatus described herein on a light emitting side of the display panel, the display apparatus being switchable between a privacy mode and a non-privacy mode.

In another aspect, the present invention provides a method of operating a display apparatus described herein, comprising receiving a first user input; and operating the display apparatus in the privacy mode based on the first user input; wherein operating the display apparatus in the privacy mode comprises controlling the plurality of first regions in the first liquid crystal layer to be light blocking while the other regions in the first liquid crystal layer being light transmissive; and controlling the plurality of second regions in the second liquid crystal layer to be light blocking while the other regions in the second liquid crystal layer being light transmissive.

Optionally, the method further comprises receiving a second user input; and operating the display apparatus in the non-privacy mode based on the second user input; wherein operating the display apparatus in the non-privacy mode comprises controlling the plurality of first regions and the other regions in the first liquid crystal layer to be light transmissive; and controlling the plurality of second regions and the other regions in the second liquid crystal layer to be light transmissive.

Optionally, the first liquid crystal layer further comprises a plurality of third regions, the plurality of first regions and the plurality of third regions are arranged substantially along the first direction, each of the plurality of third regions and each of the plurality of first regions extending substantially along the second direction, adjacent first regions of the plurality of first regions being spaced apart by one of the plurality of third regions; the second liquid crystal layer further comprises a plurality of fourth regions, the plurality of second regions and the plurality of fourth regions are arranged substantially along the first direction, each of the plurality of fourth regions and each of the plurality of second regions extending substantially along the second direction, adjacent second regions of the plurality of second regions being spaced apart by one of the plurality of fourth regions; operating the display apparatus in the privacy mode comprises controlling the plurality of first regions in the first liquid crystal layer to be light blocking while the plurality of third regions in the first liquid crystal layer being light transmissive; and controlling the plurality of second regions in the second liquid crystal layer to be light blocking while the plurality of fourth regions in the second liquid crystal layer being light transmissive.

Optionally, the first controller comprises a first electrode layer comprising a plurality of first electrodes; and the second controller comprises a second electrode layer comprising a plurality of second electrodes; operating the display apparatus in the privacy mode comprises applying a voltage to the plurality of first electrodes to control the plurality of first regions to be light blocking; and applying a voltage to the plurality of second electrodes to control the plurality of second regions to be light blocking.

Optionally, the first controller further comprises a third electrode layer comprising a plurality of third electrodes; and the second controller comprises a fourth electrode layer comprising a plurality of fourth electrodes; operating the display apparatus in the privacy mode further comprises applying a voltage to the plurality of third electrodes to control the plurality of third regions to be light transmissive; and applying a voltage to the plurality of fourth electrodes to control the plurality of fourth regions to be light transmissive; operating the display apparatus in the non-privacy mode comprises applying a voltage to the plurality of first electrodes, the plurality of second electrodes, the plurality of third electrodes, and the plurality of fourth electrodes to control the plurality of first regions, the plurality of second regions, the plurality of third regions, and the plurality of fourth regions to be light transmissive.

Optionally, the first controller further comprises a fifth electrode layer on aside of the first liquid crystal layer distal to the first electrode layer and the third electrode layer; the second controller further comprises a sixth electrode layer on a side of the second liquid crystal layer distal to the second electrode layer and the fourth electrode layer; and the method further comprising providing a common voltage to the fifth electrode layer and the sixth electrode layer.

In another aspect, the present invention provides a method of fabricating a peep-proof apparatus for switching a viewing angle of a display panel between a first viewing angle and a second viewing angle, comprising forming a first liquid crystal layer on a base substrate; forming a second liquid crystal layer on a side of the first liquid crystal layer distal to the base substrate; forming a first controller configured to control the first liquid crystal layer to switch between being light transmissive and being light blocking in a plurality of first regions spaced apart from each other while other regions in the first liquid crystal layer being light transmissive; and forming a second controller configured to control the second liquid crystal layer to switch between being light transmissive and being light blocking in a plurality of second regions spaced apart from each other while other regions in the second liquid crystal layer being light transmissive.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
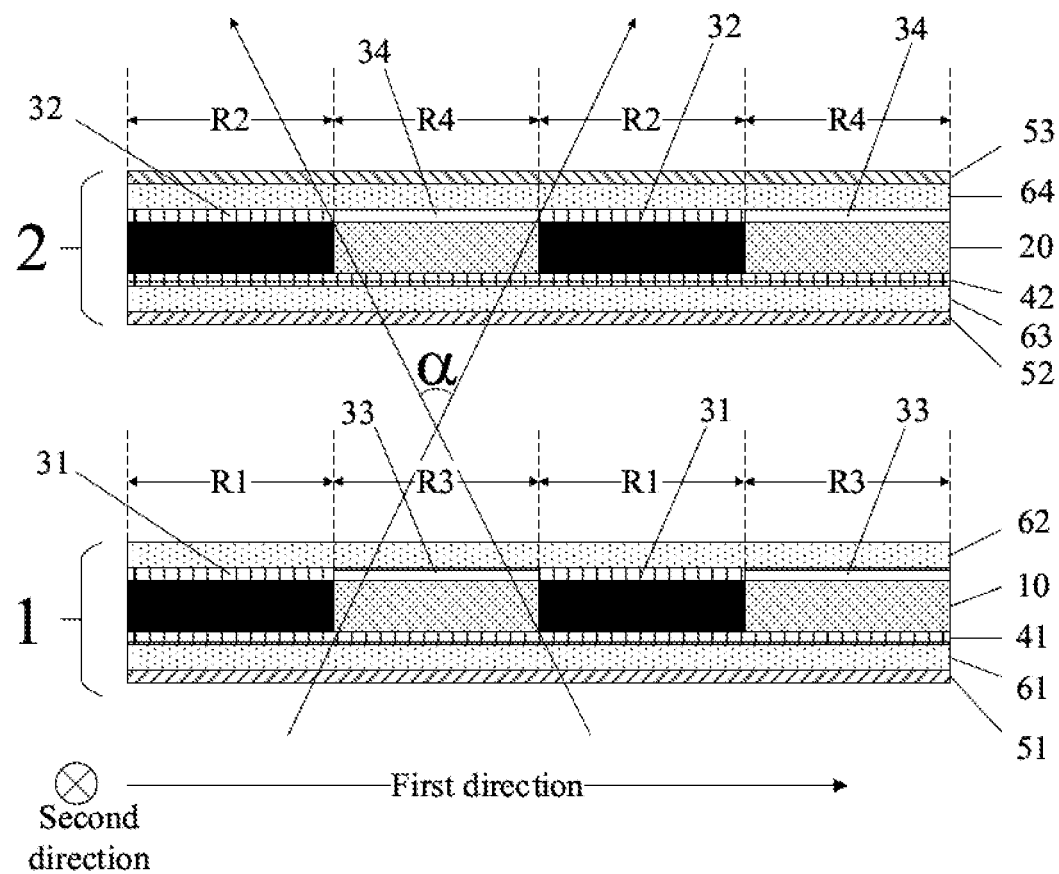
FIG. 1 is a schematic diagram illustrating the structure of a peep-proof apparatus in a privacy mode in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Conventional anti-peeping privacy apparatuses typically utilize a privacy protector (e.g., a privacy filter manufactured by 3M). The privacy protector includes vertically arranged, extremely fine micro-structures, each of which is aligned to be perpendicular to the display screen. Once having the privacy protector installed on a display apparatus, the display apparatus can only operate in a privacy mode, and cannot be switched between the privacy mode and a non-privacy mode. The display apparatus having a privacy protector installed has a limited viewing angle. This design becomes very inconvenient to a user when there is a need to share the display screen with another person.

Accordingly, the present disclosure provides, inter alia, a peep-proof apparatus for switching a viewing angle of a display panel between a first viewing angle and a second viewing angle, a display apparatus, a method of operating a display apparatus, and a method of fabricating a peep-proof apparatus that substantially obviate one or more of the problems due to limitations and disadvantages of the related art. In one aspect, the present disclosure provides a peep-proof apparatus for switching a viewing angle of a display panel between a first viewing angle and a second viewing angle. In some embodiments, the peep-proof apparatus includes a base substrate; a first liquid crystal layer on the base substrate; a second liquid crystal layer on a side of the first liquid crystal layer distal to the base substrate; a first controller configured to control the first liquid crystal layer to switch between being light transmissive and being light blocking in a plurality of first regions spaced apart from each other while other regions in the first liquid crystal layer being light transmissive; and a second controller configured to control the second liquid crystal layer to switch between being light transmissive and being light blocking in a plurality of second regions spaced apart from each other while other regions in the second liquid crystal layer being light transmissive.

Optionally, the first viewing angle corresponds to a privacy mode in which both the plurality of first regions and the plurality of second regions being light blocking while other regions in the first liquid crystal layer and the second liquid crystal layer being light transmissive. Optionally, the second viewing angle corresponds to a non-privacy mode in which both the plurality of first regions and the plurality of second regions being light transmissive while other regions in the first liquid crystal layer and the second liquid crystal layer being light transmissive. Optionally, the first viewing angle is smaller than the second viewing angle.

Figure 2:
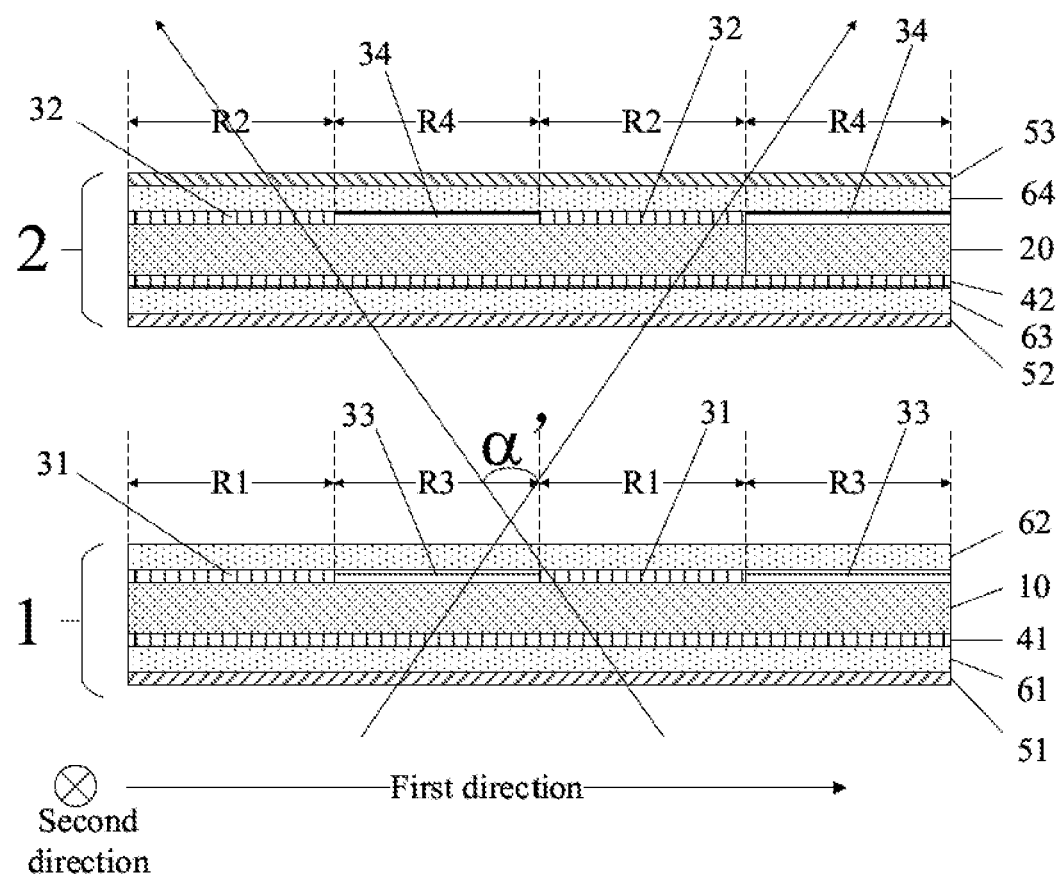
FIG. 2 is a schematic diagram illustrating the structure of a peep-proof apparatus in a non-privacy mode in some embodiments according to the present disclosure.

FIG. 1 is a schematic diagram illustrating the structure of a peep-proof apparatus in a privacy mode in some embodiments according to the present disclosure. FIG. 2 is a schematic diagram illustrating the structure of a peep-proof apparatus in a non-privacy mode in some embodiments according to the present disclosure. Referring to FIG. 1 and FIG. 2, the peep-proof apparatus in some embodiments includes a first liquid crystal cell 1 and a second liquid crystal cell 2. The first liquid crystal cell 1 includes a first liquid crystal layer 10 on a first base substrate 61. The first liquid crystal cell 1 further includes a first counter substrate 62 opposite to the first base substrate 61. The second liquid crystal cell 2 includes a second liquid crystal layer 20 on a second base substrate 63, the second liquid crystal layer 20 being on a side of the first liquid crystal layer 10 distal to the first base substrate 61. The first controller and the second controller are configured to set the peep-proof apparatus in a privacy mode (FIG. 1) or a non-privacy mode (FIG. 2). The second liquid crystal cell 2 further includes a second counter substrate 64 opposite to the second base substrate 63. In some embodiments, the privacy mode and the non-privacy mode are set by controlling light transmittance of the first liquid crystal layer 10 and the second liquid crystal layer 20 respectively by a first controller and a second controller. Various appropriate controllers may be used for controlling the light transmittance of the first liquid crystal layer 10 and the second liquid crystal layer 20. In some embodiments, and as illustrated in FIG. 1 and FIG. 2, the first controller and the second controller include electrode layers for applying an electrical signal (e.g., a voltage) to the first liquid crystal layer 10 and the second liquid crystal layer 20, respectively. In one example, the first controller includes one or more of a first electrode layer having a plurality of first electrodes 31, a third electrode layer having a plurality of third electrodes 33, and a fifth electrode layer 41, as illustrated in FIG. 1. In another example, the second controller includes one or more of a second electrode layer having a plurality of second electrodes 32, a fourth electrode layer having a plurality of fourth electrodes 34, and a sixth electrode layer 42, as illustrated in FIG. 1.

Referring to FIG. 1, in the privacy mode, a plurality of first regions R1 in the first liquid crystal layer 10 are controlled to be light blocking while other regions in the first liquid crystal layer 10 remain light transmissive, and a plurality of second regions R2 in the second liquid crystal layer 20 are controlled to be light blocking while other regions in the second liquid crystal layer 20 remain light transmissive. The plurality of first regions R1 are spaced apart from each other. The plurality of second regions R2 are spaced apart from each other. The plurality of first regions R1 and the plurality of second regions R2 are designed so that, in the privacy mode, light emitted from a display panel can still pass through the peep-proof apparatus, e.g., the first liquid crystal cell 1 and the second liquid crystal cell 2, but with a smaller viewing angle. In the privacy mode, light emitted from the display panel is partially blocked by the plurality of first regions R1 and the plurality of second regions R2, which are in a light blocking state in the privacy mode. Referring to FIG. 2, in the non-privacy mode, the plurality of first regions R1 and other regions in the first liquid crystal layer 10 (e.g., all regions of the first liquid crystal layer 10) are controlled to be light transmissive, and the plurality of second regions R2 and other regions in the second liquid crystal layer 20 (e.g., all regions of the second liquid crystal layer 20) are controlled to be light transmissive. As illustrated in FIG. 1, the peep-proof apparatus in the privacy mode can control a viewing angle of a display panel attached to the peep-proof apparatus to be a first viewing angle α. The first viewing angle α is defined by the plurality of first regions R1 in the first liquid crystal layer 10 and the plurality of second regions R2 in the second liquid crystal layer 20, which are light blocking in the privacy mode. As illustrated in FIG. 2, in the non-privacy mode, light path is not constrained by the plurality of first regions R1 in the first liquid crystal layer 10 and the plurality of second regions R2 in the second liquid crystal layer 20, which are light transmissive in the non-privacy mode. The viewing angle of the display panel attached to the peep-proof apparatus is denoted as a second viewing angle α' in FIG. 2. The second viewing angle α' is greater than the first viewing angle α. The second viewing angle α' corresponds to both the plurality of first regions R and the plurality of second regions R2 being light transmissive while other regions in the first liquid crystal layer 10 and the second liquid crystal layer 20 also being light transmissive. The first viewing angle α corresponds to both the plurality of first regions R1 and the plurality of second regions R2 being light blocking while other regions in the first liquid crystal layer 10 and the second liquid crystal layer 20 being light transmissive.

In some embodiments, the first controller is configured to control the plurality of first regions R1 spaced apart from each other in the first liquid crystal layer 10 to switch between being light transmissive and being light blocking while other regions in the first liquid crystal layer 10 being light transmissive, and the second controller is configured to control the plurality of second regions R2 spaced apart from each other in the second liquid crystal layer 20 to switch between being light transmissive and being light blocking while other regions in the second liquid crystal layer 20 being light transmissive, thereby switching the peep-proof apparatus between the privacy mode and the non-privacy mode.

Various appropriate controlling mechanisms and structures may be implemented in the first controller and the second controller to control the light transmittance of the first liquid crystal layer 10 and the second liquid crystal layer 20, respectively. Referring to FIG. 1 and FIG. 2, in some embodiments, the first controller includes a first electrode layer having a plurality of first electrodes 31, each of which being configured to control liquid crystal molecule orientation in one of the plurality of first regions R1, thereby controlling light transmittance in the plurality of first regions R1. In some embodiments, the second controller includes a second electrode layer having a plurality of second electrodes 32, each of which being configured to control liquid crystal molecule orientation in one of the plurality of second regions R2, thereby controlling light transmittance in the plurality of second regions R2. Optionally, the first electrode layer is a pixel electrode layer corresponding to the plurality of first regions R1, and the second electrode layer is a pixel electrode layer corresponding to the plurality of second region R2. The light transmittance of the first liquid crystal layer 10 and the second liquid crystal layer 20 may be controlled using various appropriate liquid crystal driving modes. Optionally, one or both of the first liquid crystal layer 10 and the second liquid crystal layer 20 we controlled in a twisted nematic mode. Optionally, one or both of the first liquid crystal layer 10 and the second liquid crystal layer 20 are controlled in an advanced super-dimension switch mode.

Referring to FIG. 1 and FIG. 2, in some embodiments, the plurality of first regions R1 are arranged substantially along a first direction, each of the plurality of first regions R1 extending substantially along a second direction. Optionally, the plurality of second regions R2 are arranged substantially along the first direction, each of the plurality of second regions R2 extending substantially along the second direction. Optionally, each of the plurality of first regions R1 and each of the plurality of second regions R2 are substantially parallel to each other. Optionally, the plurality of first electrodes 31 are arranged substantially along the first direction, each of the plurality of first electrodes 31 extending substantially along the second direction. Optionally, the plurality of second electrodes 32 are arranged substantially along the first direction, each of the plurality of second electrodes 32 extending substantially along the second direction. Optionally, each of the plurality of first electrodes 31 and each of the plurality of second electrodes 32 are substantially parallel to each other.

In some embodiments, the first liquid crystal layer 10 further includes a plurality of third regions R3, and the second liquid crystal layer 20 further includes a plurality of fourth regions R4. Optionally, the plurality of third regions R3 are arranged substantially along the first direction, each of the plurality of third regions R3 extending substantially along the second direction. Optionally, the plurality of fourth regions R4 are arranged substantially along the first direction, each of the plurality of fourth regions R4 extending substantially along the second direction. Optionally, each of the plurality of third regions R3 and each of the plurality of fourth regions R4 are substantially parallel to each other. Optionally, adjacent first regions of the plurality of first regions R1 are spaced apart by one of the plurality of third regions R3. Optionally, adjacent second regions of the plurality of second regions R2 are spaced apart by one of the plurality of fourth regions R4. The first controller is configured to control the plurality of first regions R1 to switch between being light transmissive and being light blocking while the plurality of third regions R3 being light transmissive, and the second controller is configured to control the plurality of second regions R2 to switch between being light transmissive and being light blocking while the plurality of fourth regions R4 being light transmissive. In the privacy mode, the first controller is configured to control the plurality of first regions R1 to be light blocking and control the plurality of third regions R3 to be light transmissive, and the second controller is configured to control the plurality of second regions R2 to be light blocking and control the plurality of fourth regions R4 to be light transmissive. In the non-privacy mode, the first controller is configured to control the plurality of first regions R1 and the plurality of third regions R3 to be light transmissive, and the second controller is configured to control the plurality of second regions R2 and the plurality of fourth regions R4 to be light transmissive.

Referring to FIG. 1 and FIG. 2, in some embodiments, the first controller further includes a third electrode layer having a plurality of third electrodes 33, each of which being configured to control liquid crystal molecule orientation in one of the plurality of third regions R3, thereby controlling light transmittance in the plurality of third regions R3. In some embodiments, the second controller further includes a fourth electrode layer having a plurality of fourth electrodes 34, each of which being configured to control liquid crystal molecule orientation in one of the plurality of fourth regions R4, thereby controlling light transmittance in the plurality of fourth regions R4. Optionally, the third electrode layer is a pixel electrode layer corresponding to the plurality of third regions R3, and the fourth electrode layer is a pixel electrode layer corresponding to the plurality of fourth region R4. Optionally, the plurality of third electrodes 33 we arranged substantially along the first direction, each of the plurality of third electrodes 33 extending substantially along the second direction. Optionally, the plurality of fourth electrodes 34 are arranged substantially along the first direction, each of the plurality of fourth electrodes 34 extending substantially along the second direction. Optionally, each of the plurality of third electrodes 33 and each of the plurality of fourth electrodes 34 are substantially parallel to each other.

In some embodiments, the first liquid crystal layer 10 and the second liquid crystal layer 20 are controlled in a twisted nematic mode. Optionally, the first controller further includes a fifth electrode layer 41 on a side of the first liquid crystal layer 10 distal to the first electrode layer and the third electrode layer, and the second controller further includes a sixth electrode layer 42 on a side of the second liquid crystal layer 20 distal to the second electrode layer and the fourth electrode layer. Optionally, the fifth electrode layer 41 is a common electrode layer and is provided with a common voltage. Optionally, the sixth electrode layer 42 is a common electrode layer and is provided with a common voltage. As shown in FIG. 1 and FIG. 2, the first electrode layer, the third electrode layer, the fifth electrode layer 41, and the first liquid crystal layer 10 constitute a first twisted nematic liquid crystal cell; and the second electrode layer, the fourth electrode layer, the sixth electrode layer 42, and the second liquid crystal layer 20 constitute a second twisted nematic liquid crystal cell. Other liquid crystal driving modes (e.g., a fringe-field driving mode) may be used to control the first liquid crystal layer 10 and the second liquid crystal layer 20, and the common electrode layers may be disposed in other appropriate positions of the peep-proof apparatus.

In some embodiments, the first liquid crystal cell 1 (e.g., a first twisted nematic liquid crystal cell) further includes a first polarizer 51, and the second liquid crystal cell 2 (e.g., a second twisted nematic liquid crystal cell) further includes a third polarizer 53. The first polarizer 51 is on side of the first liquid crystal layer 10 distal to the second liquid crystal layer 20, and the third polarizer 53 is on side of the second liquid crystal layer 20 distal to the first liquid crystal layer 10. Optionally, the peep-proof apparatus further includes a second polarizer 52 between the first liquid crystal layer 10 and the second liquid crystal layer 20. Optionally, a transmission axis of the second polarizer 52 is substantially perpendicular to those of the first polarizer 51 and the third polarizer 53. Optionally, a transmission axis of the first polarizer 51 is substantially parallel to that of the third polarizer 53.

In some embodiments, the first liquid crystal cell 1 and the second liquid crystal cell 2 are aligned with respect to each other so that in privacy mode the light blocking regions in the first liquid crystal layer 10 are aligned with the light blocking regions in the second liquid crystal layer 20, and the light transmissive regions in the first liquid crystal layer 10 are aligned with the light transmissive regions in the second liquid crystal layer 20. Referring to FIG. 1 and FIG. 2, in some embodiments, projections of the plurality of first regions R1 and the plurality of second regions R2 on the first base substrate 61 at least partially overlap with each other, e.g., a projection of each of the plurality of first regions R1 on the first base substrate 61 at least partially overlaps with that of one of the plurality of second regions R2. Optionally, projections of the plurality of third regions R3 and the plurality of fourth regions R4 on the first base substrate 61 at least partially overlap with each other, e.g., a projection of each of the plurality of third regions R3 on the first base substrate 61 at least partially overlaps with that of one of the plurality of fourth regions R4. Optionally, the projections of the plurality of first regions R1 and the plurality of second regions R2 on the first base substrate 61 substantially overlap with each other, e.g., the projection of each of the plurality of first regions R1 on the first base substrate 61 substantially overlaps with that of one of the plurality of second regions R2. Optionally, the projections of the plurality of third regions R3 and the plurality of fourth regions R4 on the first base substrate 61 substantially overlap with each other, e.g., the projection of each of the plurality of third regions R3 on the first base substrate 61 substantially overlaps with that of one of the plurality of fourth regions R4.

In some embodiments, projections of the plurality of first electrodes 31 and the plurality of second electrodes 32 on the first base substrate 61 at least partially overlap with each other, e.g., a projection of each of the plurality of first electrodes 31 on the first base substrate 61 at least partially overlaps with that of one of the plurality of second electrodes 32. Optionally, projections of the plurality of third electrodes 33 and the plurality of fourth electrode 34 on the first base substrate 61 at least partially overlap with each other, e.g., a projection of each of the plurality of third electrodes 33 on the first base substrate 61 at least partially overlaps with that of one of the plurality of fourth electrodes 34. Optionally, the projections of the plurality of first electrodes 31 and the plurality of second electrodes 32 on the first base substrate 61 substantially overlap with each other, e.g., the projection of each of the plurality of first electrodes 31 on the first base substrate 61 substantially overlaps with that of one of the plurality of second electrodes 32. Optionally, the projections of the plurality of third electrodes 33 and the plurality of fourth electrodes 34 on the first base substrate 61 substantially overlap with each other, e.g., the projection of each of the plurality of third electrodes 33 on the first base substrate 61 substantially overlaps with that of one of the plurality of fourth electrodes 34.

Figure 3:
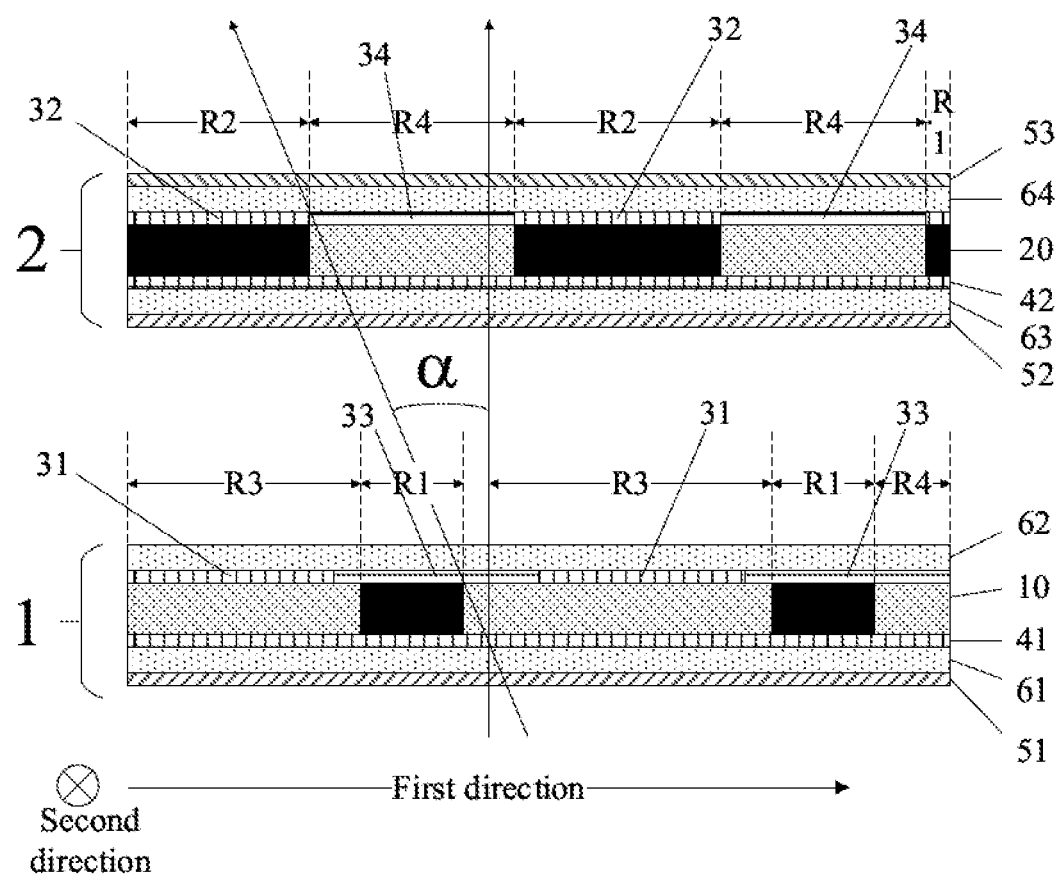
FIG. 3 is a schematic diagram illustrating the structure of a peep-proof apparatus in a privacy mode in some embodiments according to the present disclosure.
Figure 4:
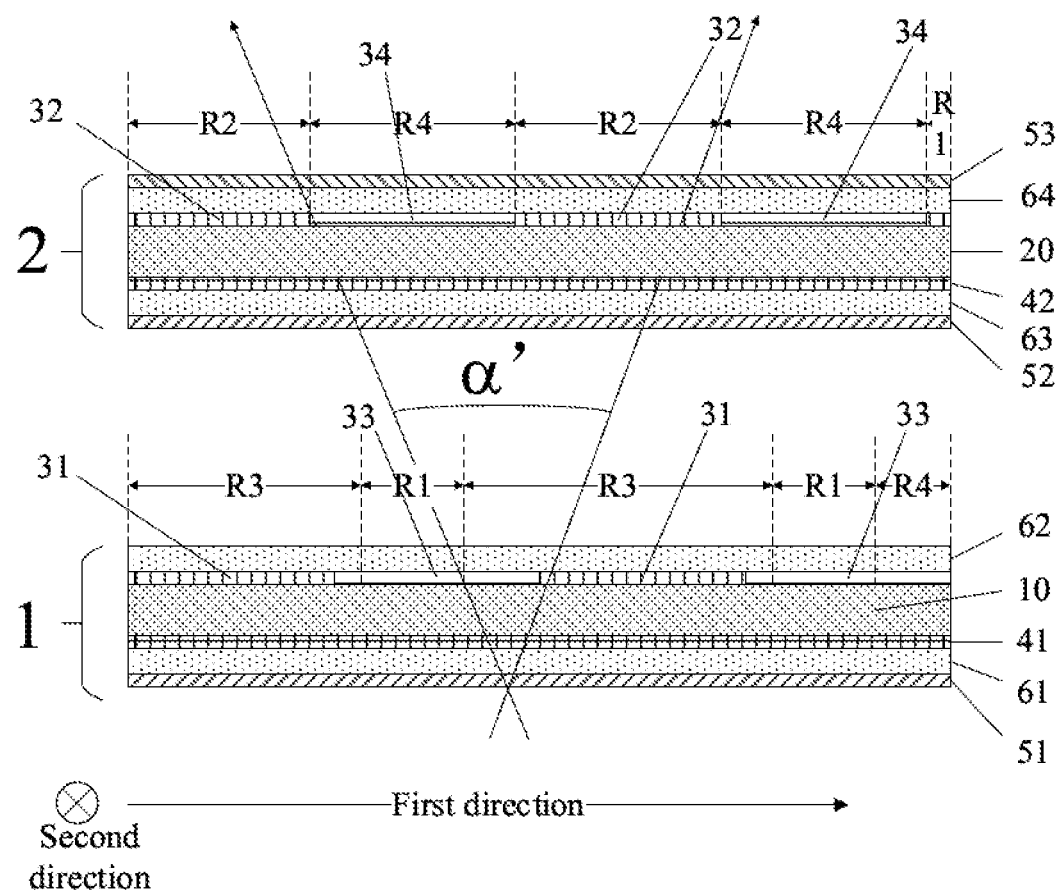
FIG. 4 is a schematic diagram illustrating the structure of a peep-proof apparatus in a non-privacy mode in some embodiments according to the present disclosure.

In some embodiments, the first liquid crystal cell 1 and the second liquid crystal cell 2 are aligned with respect to each other so that in privacy mode the light blocking regions in the first liquid crystal layer 10 are aligned with the light transmissive regions in the second liquid crystal layer 20, and the light transmissive regions in the first liquid crystal layer 10 are aligned with the light blocking regions in the second liquid crystal layer 20. FIG. 3 is a schematic diagram illustrating the structure of a peep-proof apparatus in a privacy mode in some embodiments according to the present disclosure. FIG. 4 is a schematic diagram illustrating the structure of a peep-proof apparatus in a non-privacy mode in some embodiments according to the present disclosure. Referring to FIG. 3 and FIG. 4, in some embodiments, projections of the plurality of first regions R1 and the plurality of second regions R2 on the first base substrate 61 are substantially non-overlapping with each other, e.g., a projection of each of the plurality of first regions R1 on the first base substrate 61 is substantially non-overlapping with those of the plurality of second regions R2. Optionally, a projection of each of the plurality of first regions R1 on the first base substrate 61 at least partially overlaps with that of one of the plurality of fourth regions R4. Optionally, projections of the plurality of fourth regions R4 on the first base substrate 61 are larger than and substantially cover the projections of the plurality of first regions R1 on the first base substrate 61, e.g., a projection of each of the plurality of fourth regions R4 on the first base substrate 61 is larger than and substantially covers a projection of one of the plurality of first regions R1 on the first base substrate 61. Optionally, a projection of each of the plurality of second regions R2 on the first base substrate 61 at least partially overlaps with that of one of the plurality of third regions R3. Optionally, projections of the plurality of third regions R3 on the first base substrate 61 are larger than and substantially cover the projections of the plurality of second regions R2 on the first base substrate 61, e.g., a projection of each of the plurality of third regions R3 on the first base substrate 61 is larger than and substantially covers a projection of one of the plurality of second regions R2 on the first base substrate 61.

In some embodiments, projections of the plurality of first electrodes 31 and the plurality of second electrodes 32 on the first base substrate 61 are substantially non-overlapping with each other, e.g., a projection of each of the plurality of first electrodes 31 on the first base substrate 61 is substantially non-overlapping with those of the plurality of second electrodes 32. Optionally, a projection of each of the plurality of first electrodes 31 on the first base substrate 61 at least partially overlaps with that of one of the plurality of fourth electrodes 34. Optionally, projections of the plurality of fourth electrodes 34 on the first base substrate 61 are larger than and substantially cover the projections of the plurality of first electrodes 31 on the first base substrate 61, e.g., a projection of each of the plurality of fourth electrodes 34 on the first base substrate 61 is larger than and substantially covers a projection of one of the plurality of first electrodes 31 on the first base substrate 61. Optionally, a projection of each of the plurality of second electrodes 32 on the first base substrate 61 at least partially overlaps with that of one of the plurality of third electrodes 33. Optionally, projections of the plurality of third electrodes 33 on the first base substrate 61 are larger than and substantially cover the projections of the plurality of second electrodes 32 on the first base substrate 61, e.g., a projection of each of the plurality of third electrodes 33 on the first base substrate 61 is larger than and substantially covers a projection of one of the plurality of second electrodes 32 on the first base substrate 61.

As illustrated in FIG. 3, the peep-proof apparatus in the privacy ode in some embodiments can control a viewing angle of a display panel attached to the peep-proof apparatus to be a first viewing angle α. The first viewing angle α is defined by the plurality of first regions R1 in the first liquid crystal layer 10 and the plurality of second regions R2 in the second liquid crystal layer 20, which are light blocking in the privacy mode. As illustrated in FIG. 4, in the non-privacy mode, light path is not constrained by the plurality of first regions R1 in the first liquid crystal layer 10 and the plurality of second regions R2 in the second liquid crystal layer 20, which are light transmissive in the non-privacy mode. The viewing angle of the display panel attached to the peep-proof apparatus is denoted as a second viewing angle α' in FIG. 4. The second viewing angle α' is greater than the first viewing angle α. The second viewing angle α' corresponds to both the plurality of first regions R1 and the plurality of second regions R2 being light transmissive while other regions in the first liquid crystal layer 10 and the second liquid crystal layer 20 also being light transmissive. The first viewing angle α corresponds to both the plurality of first regions R1 and the plurality of second regions R2 being light blocking while other regions in the first liquid crystal layer 10 and the second liquid crystal layer 20 being light transmissive.

In some embodiments, the peep-proof apparatus includes a first liquid crystal cell 1 and a second liquid crystal cell 2, as shown in FIGS. 1 to 4. Optionally, the first liquid crystal cell 1 and the second liquid crystal cell 2 are fabricated sequentially in a continuous process, Optionally, the first liquid crystal cell 1 and the second liquid crystal cell 2 are fabricated separately and then assembled together.

Figure 5:
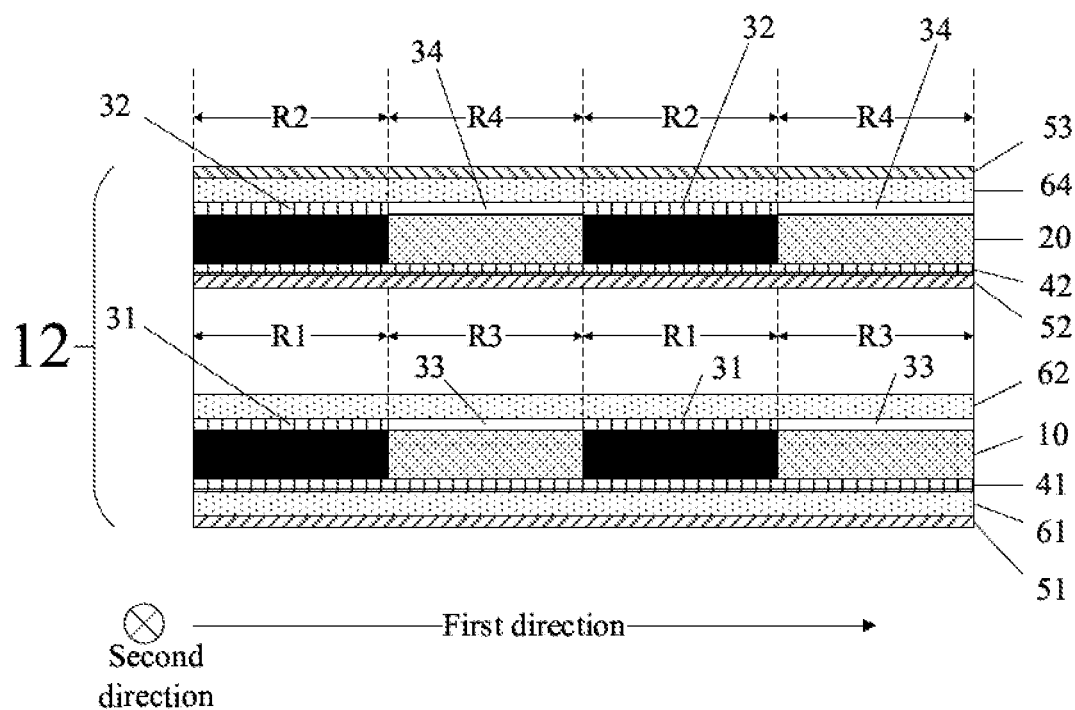
FIG. 5 is a schematic diagram illustrating the structure of a peep-proof apparatus in a privacy mode in some embodiments according to the present disclosure.

In some embodiments, the peep-proof apparatus includes an integrated liquid crystal cell. FIG. 5 is a schematic diagram illustrating the structure of a peep-proof apparatus in a privacy mode in some embodiments according to the present disclosure. Referring to FIG. 5, the peep-proof apparatus includes an integrated liquid crystal cell 12. The integrated liquid crystal cell 12 includes a base substrate 61, a first liquid crystal layer 10 on the base substrate 61, a second liquid crystal layer 20 on a side of the first liquid crystal layer 10 distal to the base substrate 61. Optionally, the integrated liquid crystal cell 12 further includes a first polarizer 51 on side of the first liquid crystal layer 10 distal to the second liquid crystal layer 20. Optionally, the integrated liquid crystal cell 12 further includes a third polarizer 53 on side of the second liquid crystal layer 20 distal to the first liquid crystal layer 10. Optionally, the integrated liquid crystal cell 12 further includes a second polarizer 52 between the first liquid crystal layer 10 and the second liquid crystal layer 20. The peep-proof apparatus in FIG. 5 differs from that in FIG. 1 in that a second base substrate 63 in FIG. 1 is not required in FIG. 5.

Figure 6:
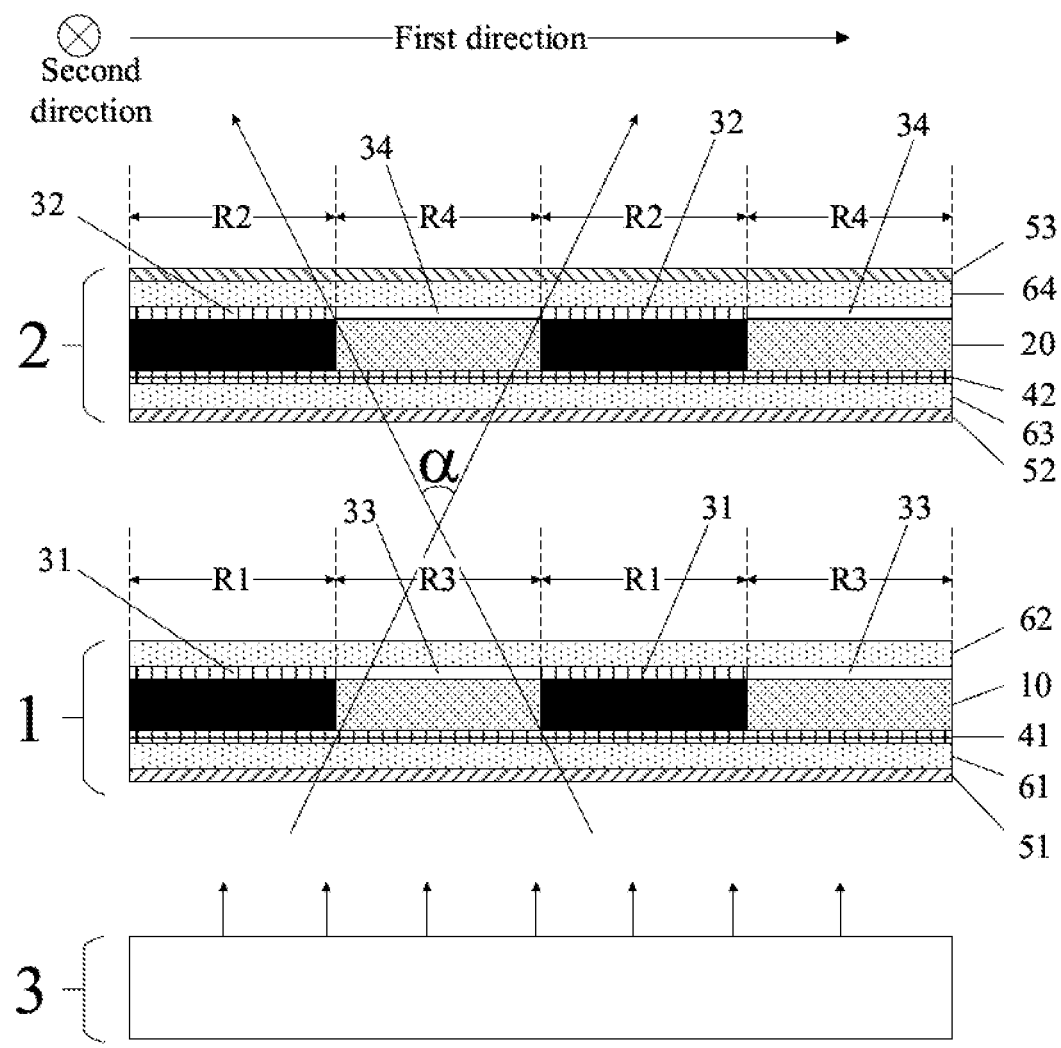
FIG. 6 is a schematic diagram illustrating the structure of a display apparatus having a peep-proof apparatus in some embodiments according to the present disclosure.

In another aspect, the present disclosure provides a display apparatus having a display panel and a peep-proof apparatus described herein. The peep-proof apparatus is disposed on a light emitting side of the display panel, and the display apparatus is configured to be switchable between a privacy mode and a non-privacy mode. FIG. 6 is a schematic diagram illustrating the structure of a display apparatus having a peep-proof apparatus in some embodiments according to the present disclosure. Referring to FIG. 6, the display apparatus includes a display panel 3, a first liquid crystal cell 1 on a light emitting side of the display panel 3, and a second liquid crystal cell 2 on a side of the first liquid crystal cell 1 distal to the display panel 3. Light emitted from the display panel 3 first passes through the first liquid crystal cell 1 before it passes through the second liquid crystal cell 2. The first liquid crystal cell 1 includes a first liquid crystal layer 10 on a first base substrate 61. The second liquid crystal cell 2 includes a second liquid crystal layer 20 on a second base substrate 63, the second liquid crystal layer 20 being on a side of the first liquid crystal layer 10 distal to the first base substrate 61. FIG. 6 shows a peep-proof apparatus of FIG. 1. Optionally, the display apparatus may include any peep-proof apparatus described in the present disclosure, e.g., the peep-proof apparatus described in any of FIGS. 2 to 4.

Examples of appropriate display apparatuses include, but are not limited to, an electronic paper, a mobile phone, a tablet computer, a television, a monitor, a notebook computer, a digital album, a GPS, etc.

In another aspect, the present disclosure provides a method of operating a display apparatus described herein. In some embodiments, the method includes receiving a first user input and operating the display apparatus in the privacy mode based on the first user input. In some embodiments, the method includes receiving a second user input and operating the display apparatus in the non-privacy mode based on the second user input. Optionally, the step of operating the display apparatus in the privacy mode includes controlling the plurality of first regions in the first liquid crystal layer to be light blocking while the other regions in the first liquid crystal layer being light transmissive; and controlling the plurality of second regions in the second liquid crystal layer to be light blocking while the other regions in the second liquid crystal layer being light transmissive. Optionally, the step of operating the display apparatus in the non-privacy mode includes controlling the plurality of first regions and the other regions in the first liquid crystal layer (e.g., all regions of the first liquid crystal layer) to be light transmissive; and controlling the plurality of second regions and the other regions in the second liquid crystal layer (e.g., all regions of the second liquid crystal layer) to be light transmissive.

In some embodiments, the first liquid crystal layer further includes a plurality of third regions. Optionally, the plurality of first regions are arranged substantially along the first direction, and the plurality of third regions are arranged substantially along the first direction. Each of the plurality of first regions extends substantially along the second direction, and each of the plurality of third regions extends substantially along the second direction. Optionally, adjacent first regions of the plurality of first regions are spaced apart by one of the plurality of third regions. Optionally, adjacent third regions of the plurality of third regions are spaced apart by one of the plurality of first regions.

In some embodiments, the second liquid crystal layer further includes a plurality of fourth regions. Optionally, the plurality of second regions are arranged substantially along the first direction, and the plurality of fourth regions are arranged substantially along the first direction. Each of the plurality of second regions extends substantially along the second direction, and each of the plurality of fourth regions extends substantially along the second direction. Optionally, adjacent second regions of the plurality of second regions are spaced apart by one of the plurality of fourth regions. Optionally, adjacent fourth regions of the plurality of fourth regions are spaced apart by one of the plurality of second regions.

In some embodiments, the step of operating the display apparatus in the privacy mode includes controlling the plurality of first regions in the first liquid crystal layer to be light blocking while the plurality of third regions in the first liquid crystal layer being light transmissive; and controlling the plurality of second regions in the second liquid crystal layer to be light blocking while the plurality of fourth regions in the second liquid crystal layer being light transmissive. Optionally, the step of operating the display apparatus in the non-privacy mode includes controlling both the plurality of first regions and the plurality of third regions in the first liquid crystal layer (e.g., all regions of the first liquid crystal layer) to be light transmissive; and controlling both the plurality of second regions and the plurality of fourth regions in the second liquid crystal layer (e.g., all regions of the second liquid crystal layer) to be light transmissive.

In some embodiments, the first controller includes a first electrode layer having a plurality of first electrodes, and the second controller includes a second electrode layer having a plurality of second electrodes. Optionally, the step of operating the display apparatus in the privacy mode includes applying a voltage to the plurality of first electrodes to control the plurality of first regions to be light blocking; and applying a voltage to the plurality of second electrodes to control the plurality of second regions to be light blocking.

In some embodiments, the first controller further includes a third electrode layer having a plurality of third electrodes, and the second controller includes a fourth electrode layer having a plurality of fourth electrodes. Optionally, the step of operating the display apparatus in the privacy mode includes applying a voltage to the plurality of first electrodes to control the plurality of first regions to be light blocking, applying a voltage to the plurality of third electrodes to control the plurality of third regions to be light transmissive, applying a voltage to the plurality of second electrodes to control the plurality of second regions to be light blocking, and applying a voltage to the plurality of fourth electrodes to control the plurality of fourth regions to be light transmissive. Optionally, the step of operating the display apparatus in the non-privacy mode includes applying a voltage to the plurality of first electrodes, the plurality of second electrodes, the plurality of third electrodes, and the plurality of fourth electrodes to control the plurality of first regions, the plurality of second regions, the plurality of third regions, and the plurality of fourth regions to be light transmissive.

In some embodiments, the first controller further includes a fifth electrode layer on a side of the first liquid crystal layer distal to the first electrode layer and the third electrode layer, and the second controller further includes a sixth electrode layer on a side of the second liquid crystal layer distal to the second electrode layer and the fourth electrode layer. Optionally, the method further includes providing a common voltage to the fifth electrode layer and the sixth electrode layer.

In another aspect, the present disclosure provides a method of fabricating a peep-proof apparatus for switching a viewing angle of a display panel between a first viewing angle and a second viewing angle. In some embodiments, the method includes forming a first liquid crystal layer on a base substrate; forming a second liquid crystal layer on a side of the first liquid crystal layer distal to the base substrate; forming a first controller configured to control the first liquid crystal layer to switch between being light transmissive and being light blocking in a plurality of first regions spaced apart from each other while other regions in the first liquid crystal layer being light transmissive; and forming a second controller configured to control the second liquid crystal layer to switch between being light transmissive and being light blocking in a plurality of second regions spaced apart from each other while other regions in the second liquid crystal layer being light transmissive. The first viewing angle corresponds to both the plurality of first regions and the plurality of second regions being light blocking while other regions in the first liquid crystal layer and the second liquid crystal layer being light transmissive, and the second viewing angle corresponds to both the plurality of first regions and the plurality of second regions being light transmissive while other regions in the first liquid crystal layer and the second liquid crystal layer also being light transmissive. The second viewing angle is greater than the first viewing angle.

Optionally, the step of forming the first controller includes forming a first electrode layer. Optionally, the step of forming the first electrode layer includes forming a plurality of first electrodes, each of which being configured to control liquid crystal molecule orientation in one of the plurality of first regions. Optionally, the step of forming the second controller includes forming a second electrode layer. Optionally, the step of forming the second electrode layer includes forming a plurality of second electrodes, each of which being configured to control liquid crystal molecule orientation in one of the plurality of second regions.

Optionally, the plurality of first regions are arranged substantially along a first direction, each of the plurality of first regions extending substantially along a second direction. Optionally, the plurality of second regions are arranged substantially along the first direction, each of the plurality of second regions extending substantially along the second direction. Optionally, the first liquid crystal layer further includes a plurality of third regions. Optionally, the plurality of third regions are arranged substantially along the first direction, each of the plurality of third regions extending substantially along the second direction. Optionally, adjacent first regions of the plurality of first regions are spaced apart by one of the plurality of third regions. Optionally, the second liquid crystal layer further includes a plurality of fourth regions. Optionally, the plurality of fourth regions are arranged substantially along the first direction, each of the plurality of fourth regions extending substantially along the second direction. Optionally, adjacent second regions of the plurality of second regions are spaced apart by one of the plurality of fourth regions.

In some embodiments, the first controller is formed so that it is configured to control the plurality of first regions to switch between being light transmissive and being light blocking while the plurality of third regions being light transmissive; and the second controller is formed so that it is configured to control the plurality of second regions to switch between being light transmissive and being light blocking while the plurality of fourth regions being light transmissive.

In some embodiments, the step of forming the first controller further includes forming a third electrode layer. Optionally, the step of forming the third electrode layer includes forming a plurality of third electrodes, each of which being configured to control liquid crystal molecule orientation in one of the plurality of third regions. In some embodiments, the step of forming the second controller further includes forming a fourth electrode layer. Optionally, the step of forming the fourth electrode layer includes forming a plurality of fourth electrodes, each of which being configured to control liquid crystal molecule orientation in one of the plurality of fourth regions.

In some embodiments, the first electrode layer and the second electrodes layer are formed so that projections of the plurality of first electrodes and the plurality of second electrodes on the base substrate at least partially overlap with each other, e.g., the first electrode layer and the second electrodes layer are formed so that a projection of each of the plurality of first electrodes on the base substrate at least partially overlaps with that of one of the plurality of second electrodes. Optionally, the third electrode layer and the fourth electrodes layer are formed so that projections of the plurality of third electrodes and the plurality of fourth electrode on the base substrate at least partially overlap with each other, e.g., the third electrode layer and the fourth electrodes layer are formed so that a projection of each of the plurality of third electrodes on the base substrate at least partially overlaps with that of one of the plurality of fourth electrodes. Optionally, the first electrode layer and the second electrodes layer are formed so that the projections of the plurality of first electrodes and the plurality of second electrodes on the base substrate substantially overlap with each other. Optionally, the third electrode layer and the fourth electrodes layer are formed so that the projections of the plurality of third electrodes and the plurality of fourth electrodes on the base substrate substantially overlap with each other.

In some embodiments, a projection of each of the plurality of first regions on the base substrate at least partially overlaps with that of one of the plurality of second regions. Optionally, projections of the plurality of first regions and the plurality of second regions on the base substrate substantially overlap with each other; and projections of the plurality of third regions and the plurality of fourth regions on the base substrate substantially overlap with each other.

In some embodiments, the first electrode layer and the second electrodes layer are formed so that projections of the plurality of first electrodes and the plurality of second electrodes on the base substrate are substantially non-overlapping with each other, e.g., the first electrode layer and the second electrodes layer are formed so that a projection of each of the plurality of first electrodes on the base substrate is substantially non-overlapping with those of the plurality of second electrodes. Optionally, the first electrode layer and the fourth electrodes layer are formed so that a projection of each of the plurality of first electrodes on the base substrate at least partially overlaps with that of one of the plurality of fourth electrodes. Optionally, the first electrode layer and the fourth electrodes layer are formed so that projections of the plurality of fourth electrodes on the base substrate are larger than and substantially cover the projections of the plurality of first electrodes on the base substrate, e.g., the first electrode layer and the fourth electrodes layer are formed so that a projection of each of the plurality of fourth electrodes on the base substrate is larger than and substantially covers a projection of one of the plurality of first electrodes on the base substrate. Optionally, the second electrode layer and the third electrodes layer are formed so that a projection of each of the plurality of second electrodes on the base substrate at least partially overlaps with that of one of the plurality of third electrodes. Optionally, the second electrode layer and the third electrodes layer are formed so that projections of the plurality of third electrodes on the base substrate are larger than and substantially cover the projections of the plurality of second electrodes on the base substrate, e.g., the second electrode layer and the third electrodes layer ae formed so that a projection of each of the plurality of third electrodes on the base substrate is larger than and substantially covers a projection of one of the plurality of second electrodes on the base substrate.

In some embodiments, projections of the plurality of first regions and the plurality of second regions on the base substrate are substantially non-overlapping with each other. Optionally, projections of the plurality of fourth regions on the base substrate are larger than and substantially cover the projections of the plurality of first regions on the base substrate.

In some embodiments, the step of forming the first controller further includes forming a fifth electrode layer on a side of the first liquid crystal layer distal to the first electrode layer and the third electrode layer, and the step of forming the second controller further includes forming a sixth electrode layer on a side of the second liquid crystal layer distal to the second electrode layer and the fourth electrode layer. Optionally, the fifth electrode layer and the sixth electrode layer are common electrode layers, and are provided with a common voltage.

Optionally, the first electrode layer, the third electrode layer, the fifth electrode layer, and the first liquid crystal layer are formed to constitute a first twisted nematic liquid crystal cell. Optionally, the second electrode layer, the fourth electrode layer, the sixth electrode layer, and the second liquid crystal layer are formed to constitute a second twisted nematic liquid crystal cell.

In some embodiments, the method further includes forming a first polarizer on side of the first liquid crystal layer distal to the second liquid crystal layer; forming a second polarizer between the first liquid crystal layer and the second liquid crystal layer; and forming a third polarizer on side of the second liquid crystal layer distal to the first liquid crystal layer. Optionally, the first polarizer, the second polarizer, and the third polarizer are formed so that a transmission axis of the second polarizer is substantially perpendicular to those of the first polarizer and the third polarizer.

In some embodiments, the method includes forming a first liquid crystal cell having a first liquid crystal layer on a first base substrate, forming a second liquid crystal cell having a second liquid crystal layer on a second base substrate, and assembling the first liquid crystal cell and the second liquid crystal cell together. In some embodiments, the method includes forming an integrated liquid crystal cell on a single base substrate, the integrated liquid crystal cell is formed to include a first liquid crystal layer and a second liquid crystal layer. Optionally, the step of forming the integrated liquid crystal cell includes forming a polarizer between the first liquid crystal layer and the second liquid crystal layer.

In another aspect, the present disclosure provides a method of forming a display apparatus. In some embodiments, the method includes forming a display panel, forming a peep-proof apparatus according to a method described herein, and assembling the display panel and the peep-proof apparatus together so that the peep-proof apparatus is attached on a light emitting side of the display panel.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A peep-proof apparatus for switching a viewing angle of a display panel between a first viewing angle and a second viewing angle, comprising:
a base substrate;
a first liquid crystal layer on the base substrate;
a second liquid crystal layer on a side of the first liquid crystal layer distal to the base substrate;
a first controller configured to control the first liquid crystal layer to switch between being light transmissive and being light blocking in a plurality of first regions spaced apart from each other while other regions in the first liquid crystal layer being light transmissive; and
a second controller configured to control the second liquid crystal layer to switch between being light transmissive and being light blocking in a plurality of second regions spaced apart from each other while other regions in the second liquid crystal layer being light transmissive;
wherein the first viewing angle corresponds to both the plurality of first regions and the plurality of second regions being light blocking;
the second viewing angle corresponds to both the plurality of first regions and the plurality of second regions being light transmissive;
the first viewing angle being smaller than the second viewing angle;
the first controller comprises a first electrode layer comprising a plurality of first electrodes, each of which being configured to control liquid crystal molecule orientation in one of the plurality of first regions; and
the second controller comprises a second electrode layer comprising a plurality of second electrodes, each of which being configured to control liquid crystal molecule orientation in one of the plurality of second regions;
the plurality of first regions are arranged substantially along a first direction, each of the plurality of first regions extending substantially along a second direction; and
the plurality of second regions are arranged substantially along the first direction, each of the plurality of second regions extending substantially along the second direction;
the first liquid crystal layer further comprises a plurality of third regions, the plurality of third regions are arranged substantially along the first direction, each of the plurality of third regions extending substantially along the second direction, adjacent first regions of the plurality of first regions being spaced apart by one of the plurality of third regions;
the second liquid crystal layer further comprises a plurality of fourth regions, the plurality of fourth regions are arranged substantially along the first direction, each of the plurality of fourth regions extending substantially along the second direction, adjacent second regions of the plurality of second regions being spaced apart by one of the plurality of fourth regions;
the first controller is configured to control the plurality of first regions to switch between being light transmissive and being light blocking while the plurality of third regions being light transmissive; and
the second controller is configured to control the plurality of second regions to switch between being light transmissive and being light blocking while the plurality of fourth regions being light transmissive;
the first controller further comprises a third electrode layer comprising a plurality of third electrodes, each of which being configured to control liquid crystal molecule orientation in one of the plurality of third regions; and
the second controller comprises a fourth electrode layer comprising a plurality of fourth electrodes, each of which being configured to control liquid crystal molecule orientation in one of the plurality of fourth regions; and projections of the plurality of first electrodes and the plurality of second electrodes on the base substrate are substantially non-overlapping with each other.

2. The peep-proof apparatus of claim 1, wherein a projection of each of the plurality of first regions on the base substrate at least partially overlaps with that of one of the plurality of second regions.

3. The peep-proof apparatus of claim 2, wherein projections of the plurality of first regions and the plurality of second regions on the base substrate substantially overlap with each other; and projections of the plurality of third regions and the plurality of fourth regions on the base substrate substantially overlap with each other.

4. The peep-proof apparatus of claim 1, wherein projections of the plurality of first regions and the plurality of second regions on the base substrate are substantially non-overlapping with each other.

5. The peep-proof apparatus of claim 4, wherein projections of the plurality of fourth regions on the base substrate substantially cover the projections of the plurality of first regions on the base substrate.

6. The peep-proof apparatus of claim 1, wherein a projection of each of the plurality of first electrodes on the base substrate at least partially overlaps with that of one of the plurality of second electrodes.

7. The peep-proof apparatus of claim 6, wherein projections of the plurality of first electrodes and the plurality of second electrodes on the base substrate substantially overlap with each other; and projections of the plurality of third electrodes and the plurality of fourth electrodes on the base substrate substantially overlap with each other.

8. The peep-proof apparatus of claim 1, projections of the plurality of fourth electrodes on the base substrate substantially cover the projections of the plurality of first electrodes on the base substrate.

9. The peep-proof apparatus of claim 1, wherein
the first controller further comprises a fifth electrode layer on a side of the first liquid crystal layer distal to the first electrode layer and the third electrode layer;

the second controller further comprises a sixth electrode layer on a side of the second liquid crystal layer distal to the second electrode layer and the fourth electrode layer; and the fifth electrode layer and the sixth electrode layer are provided with a common voltage.

10. The peep-proof apparatus of claim 9, wherein the first electrode layer, the third electrode layer, the fifth electrode layer, and the first liquid crystal layer constitute a first twisted nematic liquid crystal cell; and the second electrode layer, the fourth electrode layer, the sixth electrode layer, and the second liquid crystal layer constitute a second twisted nematic liquid crystal cell.

11. The peep-proof apparatus of claim 9, further comprising:

a first polarizer on side of the first liquid crystal layer distal to the second liquid crystal layer;

a second polarizer between the first liquid crystal layer and the second liquid crystal layer; and a third polarizer on side of the second liquid crystal layer distal to the first liquid crystal layer;

wherein a transmission axis of the second polarizer is substantially perpendicular to those of the first polarizer and the third polarizer.

12. A display apparatus, comprising the display panel and the peep-proof apparatus of claim 1 on a light emitting side of the display panel, the display apparatus being switchable between a privacy mode and a non-privacy mode.

* * * * *